V. C. KOONS.
INCUBATOR.
APPLICATION FILED JULY 3, 1907.

916,454.

Patented Mar. 30, 1909.
4 SHEETS—SHEET 2.

V. C. KOONS.
INCUBATOR.
APPLICATION FILED JULY 3, 1907.

916,454.

Patented Mar. 30, 1909.
4 SHEETS—SHEET 3.

Witnesses
Inventor
Virgil C. Koons
By
Attorney

V. C. KOONS.
INCUBATOR.
APPLICATION FILED JULY 3, 1907.

916,454.

Patented Mar. 30, 1909.
4 SHEETS—SHEET 4.

UNITED STATES PATENT OFFICE.

VIRGIL C. KOONS, OF COLORADO SPRINGS, COLORADO, ASSIGNOR TO THE CONTINENTAL MANUFACTURING COMPANY, OF COLORADO SPRINGS, COLORADO, A CORPORATION OF COLORADO.

INCUBATOR.

No. 916,454.

Specification of Letters Patent.

Patented March 30, 1909.

Application filed July 3, 1907. Serial No. 382,084.

*To all whom it may concern:*

Be it known that I, VIRGIL C. KOONS, a citizen of the United States, residing at Colorado Springs, El Paso county, Colorado, have invented certain new and useful Improvements in Incubators; and I do hereby declare the following to be a full, clear, and exact description of the invention, such as will enable others skilled in the art to which it appertains to make and use the same.

This invention relates to certain improvements in incubators; and the objects and nature of the invention will be readily understood by those skilled in the art in the light of the following explanations of the structures shown in the accompanying drawings as my preferred embodiments from among other constructions within the spirit and scope of my invention.

My invention consists in certain novel features in construction and arrangement and in combinations as more fully and particularly set forth hereinafter.

Referring to the accompanying drawings.

The incubator comprises a suitably formed and constructed case, or inclosure 1. At the bottom or under side of the incubator case, I can, if desired, arrange a brooder chamber 2, in which the chicks can be kept until placed in a stationary or other regular brooder. This brooder 2, usually consists of a rectangular box, open at the top and detachably secured in any suitable manner to the incubator case usually forming a downward continuation thereof with the bottom wall of the incubator case forming the top wall or ceiling of said brooder. For instance, cleats or strips $a$, can be secured along the outer faces of the upper edges of the end walls of the brooder, and removable vertical screws $b$, can be passed up through the cleats and into the lower edges of the end walls of the incubator casing. Said brooder is usually formed with one or more ventilating openings $c$, in its side walls adapted to be closed and opened by exterior swinging covers or dampers $d$, and with a front opening normally closed by a swinging or hinged door 3, usually in the form of a glazed sash.

The interior of the incubator casing is usually divided horizontally into a heating chamber 4, and an egg or hatching chamber 5. I show the heated, or what might be termed heating, chamber 4, extending horizontally throughout the length and width of the lower part of the case, and immediately above the brooder 2, with the horizontal usually sheet metal floor or partition 6, which closes the bottom of the case and forms the floor of the heating chamber and the top wall of the brooder, so that the heat can radiate down through said floor 6, to heat the brooder chamber.

Figure 7:
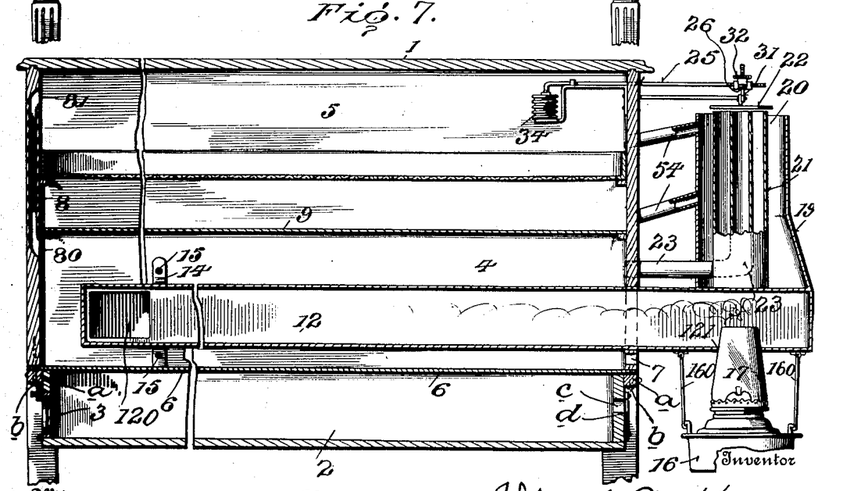

Suitable means are provided to close the heating chamber from the hatching chamber except for the communication between said chambers through the medium of hot air flues 8. For instance, in Fig. 7, I show horizontal usually sheet metal partition 9, forming the ceiling or top of the heating chamber and the floor of the egg or hatching chamber, although as at present advised by experience, I prefer, as hereinafter described, to form the partition or division by a water tank.

I usually provide the heating chamber with a front opening normally closed by a removable or hinged door 40. I also usually provide the incubator casing with a front opening approximately across the full width of the hatching chamber and normally closed by a hinged door 50, usually provided with one or more glass panels or the like through which the interior of the chamber can be observed.

In the hatching chamber, I arrange means for carrying the eggs, for instance, any suitable number of egg trays can be employed of any suitable or approved construction or material. In the drawings, I show one horizontally arranged egg tray 51, arranged intermediate the height of the hatching chamber and sliding and supported on horizontal end cleats 52, secured to the casing ends. This tray is inserted and removed through the front opening closed by door 50, and has an egg supporting floor of open-work or reticulated material through which the air can freely circulate around the eggs.

At one end fresh or outside air is admitted into the lower part of the heating chamber 4, through one or more air ducts 7, opening from the exterior through the end wall of the casing which carries the lamp heater, hereinafter described. From the opposite end of the heating chamber one or more vertical flues 8, convey the heated air upwardly and discharge the same into the upper portion of an end of the hatching chamber. In the specific example illustrated, I show the vertical flues 8, arranged at the opposite corners of said end and within the end wall with air inlets 80, at their lower ends from the upper portion of the heating chamber end and at their upper ends having outlets 81, into the upper portion of the corresponding end of the egg chamber. At the opposite end of the egg or hatching chamber, from the heated air inlets, I provide one or more outlet or discharge passages 54, opening through the casing end, said discharge or outlet pipes or passages being usually arranged above and below the egg tray so that the heated air will circulate throughout the hatching chamber and around the eggs; the draft through the chamber being maintained by the outward passage of air in the outlet or discharge pipes or passages 54.

A suitable heating system is provided for the heating chamber, for the purpose of maintaining the desired temperature in the hatching chamber and other portions of the apparatus. Various systems, within the scope of certain features of my invention, can be provided for this purpose. In the specific example illustrated, I show closed heating pipes, flues or drums longitudinally arranged within said chamber and adapted to heat the air therein, said flues removably extending through one end of the incubator casing and at the exterior of said casing, receiving the heating medium, as from a lamp, and provided with the exhaust or discharge. I show a hollow sheet metal heating drum 12, within and arranged approximately throughout the length of the heating chamber and at the lamp or heat receiving end projecting through the casing end and a distance beyond the exterior thereof. A sheet metal return drum or flue 13, is arranged beside and throughout the length of the heating drum and also extends through the casing end to the exterior thereof. At their inner or rear ends these two drums communicate through a discharge opening 120 from the heating drum to the return drum. These heating drums or flues are preferably secured together and are closed against communication between their interiors and the interior of the heating chamber to prevent escape of gases or products of combustion into the heating chamber. Said drums are supported a distance above the bottom or floor of the heating chamber and are also arranged below the top wall thereof so that the air can circulate around the drums. At their outer end portions the drums removably pass through and are suitably supported in the casing end, while at their inner ends the drums are supported by uprights or standards 14, secured to the floor 6, of the heating chamber and arranged on opposite sides of the drums and connected above and below the drums by cross bolts 15, having nuts so that the bolts can be tightened to clamp the uprights to the drums in the desired vertical adjustment. The bolts can be loosened when it is desired to raise or lower the drums and then tightened to clamp the drums in the desired position. Also the bolts can be loosened and the drums slipped out through the end of the casing for cleaning or repair. Any suitable heater can be employed, although in the drawings I show removable lamp 16, at the exterior of the casing and suitably hung as by hooks 160 from the heating drum, with its metal chimney 17, removably projecting up into the exterior end of said drum 12 through an opening 121 in the bottom wall thereof. The outer or exterior end of the return flue or drum is arranged beside the exterior or heater receiving end of the heating drum, and is provided with a top discharge opening or outlet 18.

A vertically disposed upwardly converging sheet metal hood or casing 19, is arranged at the exterior of the casing end and is secured on and rises from and incloses the top surfaces of the projecting ends of the heating and return flues. This hood is arranged directly over the lamp receiving end of the heating flue and directly over the discharge end of the return flue so that the top discharge 18, of the return flue opens into said hood. The hood converges upwardly to a reduced top discharge 20. The portion of the top wall of the heating flue against which the heat of the lamp directly impinges forms a part of the floor of said hood and hence the air in said hood is heated and rises thereby creating an upward draft through said hood and out through the top discharge 20, thereof, whereby a suction is created through the return flue discharge 18, maintaining a draft through said return flue and from the inner end of the heating flue. By this means the necessary draft is kept up through the heating and return flues to maintain proper combustion with a full lamp flame, whereby the lamp can be kept burning to the desired extent and the heat will be utilized to the maximum. Furthermore by thus maintaining an even forced draft, the heat is equally distributed throughout the heating flues and can be carried to a maximum distance laterally or horizontally from the lamp. Such a system permits the use of incubators of maximum capacity and horizontal length in connection with the one lamp or single heating system.

I usually arrange the end fresh air inlets 7, into the heating chamber, below the heating flues and into the space between the bottoms of said flues and the floor of the heating chamber, whereby said fresh or cool air passes along and around said flues and is heated to the desired extent before reaching the heated air offtakes at the opposite end of the heating chamber.

To aid in maintaining the desired circulation of air through the heating and hatching chambers, I usually arrange the discharge pipes 54, above and below the egg tray and at their outer ends opening into the upper end portion of the hood or casing 19, a distance below the upper or discharge end 20, thereof. The upward draft through said hood 19, tends to draw the air through the pipes 54, and from the hatching chamber to maintain the desired circulation through said chamber, and the vitiated air from said hatching chamber is thus drawn off and discharged through and from the hood with the waste products from the heating system.

I provide means for regulating or controlling the temperature of the hatching chamber and for relieving the heating system from the heated products when the same becomes overheated. Various means can be employed for this purpose, within the spirit and scope of my invention, but in the specific example illustrated, I show a vertical escape pipe 21, arranged about concentrically within the hood 19, with its upper open end about flush with the open top or discharge end of the hood. At its lower end this pipe 21, opens into the heating flue 12, through the top wall thereof. This escape pipe 21, is normally closed against the escape of heat or products therethrough from the heating flue, by suitable means, such as a flat vertically movable cap or damper 22, resting on and closing the top otherwise open end of said escape pipe 21. I can also provide means to reduce the heat in the heating chamber 4, when the temperature rises beyond the maximum and the escape 21, is opened, by permitting direct outflow of heated air from said chamber without passing said air through or into the hatching chamber 5. For instance, this result can be accompanied by an escape pipe 23, arranged vertically and about concentrically within escape pipe 21 and having its open upper end about flush with the open upper end of pipe 21, so that both pipes 21 and 23, will be simultaneously closed and opened by the single damper 22, said damper being of less diameter than the discharge outlet of the hood 19, so that the said outlet is always open and not affected by said damper. The lower end of pipe 23 is bent laterally and passes horizontally through pipe 21, above its lower end and through the hood and casing end and longitudinally into the heating chamber above the heating flues, and the inner end of said pipe 23, is open in said heating chamber. The arrangement is such that when the damper 22 is elevated to open pipes 21 and 23, to the atmosphere, the heated products from the lamp will pass from the lamp end of heating flue 12, direct to the atmosphere through pipe 21, instead of passing through said flue, whereby the temperature within the heating flues 12, 13 and the heating chamber 4 will be reduced. Also, the opening of pipe 23, will cause the heated air in the heating chamber to rush direct from the heating chamber through said pipe 23, thereby in a measure reversing the normal direction of circulation in said chamber, and discharging the heated air from the lamp end of said chamber and hence drawing the heated air from the opposite end of the chamber and from its normal course up through flues 8, to the hatching chamber. By these arrangements the temperature in the hatching chamber can be quickly brought down to and maintained about at the desired degree.

Any suitable thermostat actuated means can be provided for controlling the damper 22; the thermostat being usually arranged at any suitable location within the hatching chamber. For instance, I show a horizontal angular metal bracket 24, arranged within the hatching chamber and at one end fixed to the end wall of said chamber. A horizontal rock shaft 25 is mounted on and supported by said bracket and passes loosely through the casing end and projects beyond the end of the incubator casing. A lateral arm 26, is adjustably secured, by sleeve and set screw 27, to the exterior end of this shaft and projects therefrom in opposite directions. One end of said arm 26, is provided with adjustable counterweight 28. The opposite end of arm 26, is connected to raise the damper 22, and is arranged above and preferably parallel with the vertically swingable arm 29, to the free end of which the damper 22 is fixed and by which said damper is carried and controlled. This damper carrying arm 29, is pivoted to a horizontal post 30, projecting from the end wall of the incubator casing. The arm 26, is coupled to the damper arm 29, by a vertical lift rod 31, at its lower end pivotally joined to arm 29, and with its upper longitudinally threaded end passing loosely through a vertical opening in arm 26, and provided with an adjustable nut 32, engaging said arm 26, and by which the normal distance between arms 26 and 29, can be varied. Within the hatching chamber, shaft 25, is formed with a crank arm 33, arranged over the lateral end of bracket 24, and any suitable thermostat 34, is carried by said lateral horizontal end of the bracket and interposed between the same and the outer end of crank arm 33, so that the movement of the thermostat will raise or lower crank arm 33, and consequently rock shaft 25, to raise or lower the damper 22, through the medium of the connections described. The devices can be so set and adjusted that when the temperature in the hatching chamber passes above a certain degree, the thermostat will then operate to raise damper 22, and hold the same raised until the temperature in the hatching chamber drops to the desired degree. The adjustments are such that the parts can be accurately set to raise the damper when a certain degree of temperature is reached in the hatching chamber, and the damper is quickly raised and controlled particularly by reason of the location of the pull rod 31, near the fulcrum of damper arm 29, and also by locating shaft arm 26, over and extending in the same direction as arm 29, although I do not wish to so limit all features of my invention.

Figure 1:
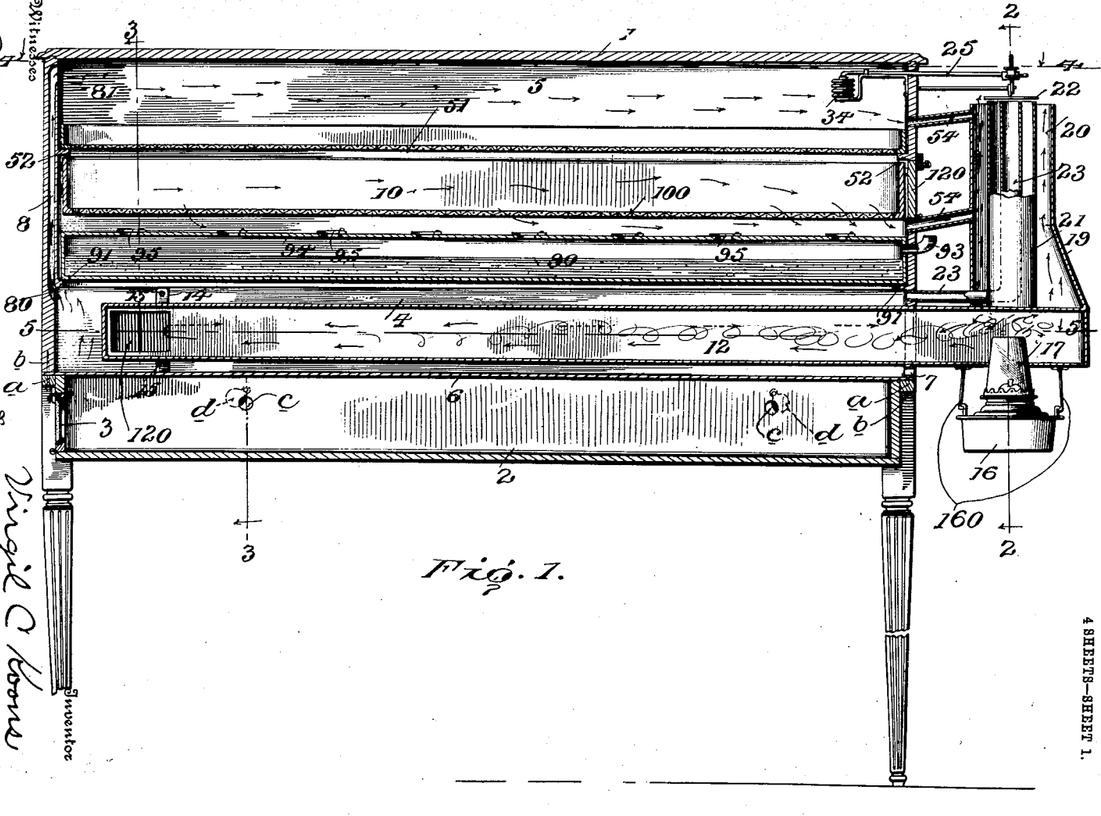
Figure 1, is a longitudinal section taken vertically through the incubator.
Figure 2:
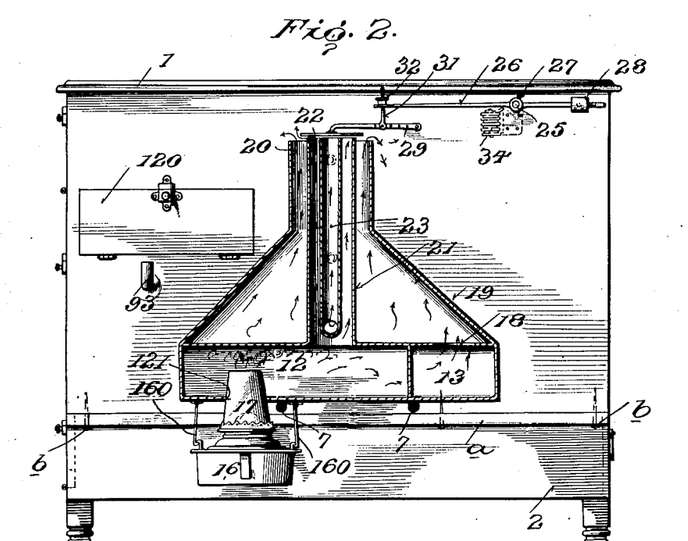
Fig. 2, is a vertical cross section taken on the line 2—2, Fig. 1.
Figure 3:
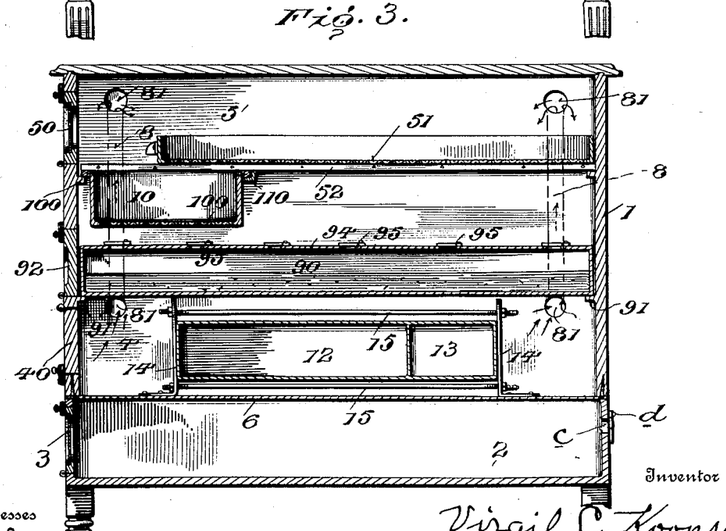
Fig. 3, is a vertical cross section in the plane of the line 3—3, Fig. 1.
Figures 4, 5:
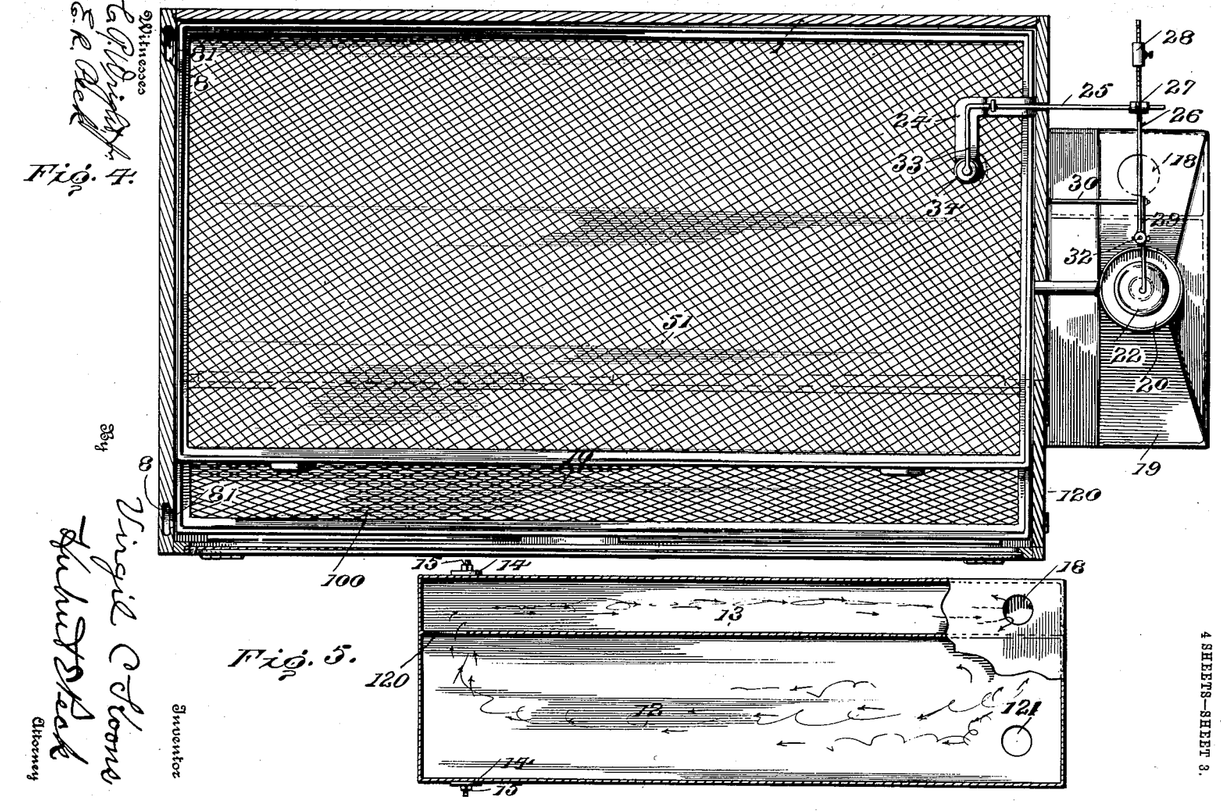
Fig. 4, is a horizontal section on the line 4—4, Fig. 1.
Fig. 5, is a longitudinal horizontal section on a reduced scale on the line 5—5, Fig. 1.

Any suitable means can be provided, in or communicating with the hatching chamber, to receive the chicks as hatched from the eggs on the egg tray. I usually provide a suitable receptacle, or the like, in the hatching chamber, to receive the chicks from the tray and in which the chicks are maintained for a suitable period after hatching and until thoroughly dried, preparatory to being placed in the auxiliary brooder 2, if such brooder be employed as an adjunct to the incubator. In the specific example illustrated, this chick drying receptacle or chamber, is formed by a removable box or drawer 10, having a floor, sides and ends and an open top, and arranged below the plane of the egg tray so that the chicks can drop from the egg tray into said receptacle without danger of injury to the chicks. I show the egg tray in length equal to the full length of the hatching chamber, but in width less than the width of the hatching chamber so that when said tray is slipped into the hatching chamber to the rear wall thereof, the front edge of the egg tray will be located a distance rearwardly from the glass paneled front door 50, to the hatching chamber. I show the chick receptacle arranged longitudinally of the hatching chamber between the front wall thereof and the front edge of the egg tray and below the horizontal plane of the top of the front edge of the egg tray, so that the chicks hatched on the tray will travel toward the front edge of the tray, attracted by the light through door 50, and drop into the drawer or receptacle 10. This receptacle is arranged in the hatching chamber and is preferably formed with a reticulated or wire netting floor or bottom 100, permitting free passage therethrough of the heated and moisture laden air so that the circulation of air in the hatching chamber passes through said chick receptacle as well as through the egg tray. The chick drawer or receptacle is shown supported and sliding on the cleats 110, and said drawer can be inserted and removed through an end of the incubator casing, while the egg tray can be inserted or removed over the chick drawer. An opening is formed in an end wall of the incubator casing for the passage of the chick drawer and this opening can be closed by any suitable means or in any suitable manner, as by a separate door 120, as indicated in Figs. 2 and 4.

Any suitable means can be provided to supply the desired degree of moisture in the hatching chamber. I can arrange one or more water pans in the heating chamber, although as at present advised by experiment, I prefer to form the floor of the hatching chamber and top of the heating chamber by a shallow horizontal metal tank 90, forming a partition between the heating and hatching chamber and preferably removably resting on cleats 91, secured at the inner faces of the walls of the incubator casing. I usually form the tank to slide into the incubator casing from the front, through a front opening normally closed by hinged front door 92. At one end the tank can be formed with a threaded hole adapted, when the tank is in its normal position, to register with a hole through an end of the incubator casing. When the tank has been slipped into position in the casing, an elbow or bent nozzle or funnel 93, can be passed through said hole in the casing end and screwed into the hole in the tank end with the upwardly extending funnel end in an upright position with its top at the exterior of the casing and above the water level in the tank. The tank can be supplied with water through this nozzle which also acts as vent for escape of surplus vapor. The tank can be formed at the top to permit passage of the vapor from the water in the tank directly, up into the hatching chamber through the wire net or open floors of the egg tray and chick box, receptacle or drawer, for instance, if so desired the tank can be formed with a top 94, having a suitable number of perforations therethrough for escape of vapor. Also if desired, flat caps 95, can be pivoted on the top 94, a cap for each perforation so that each perforation can be closed if desired by swinging its cap over the same. By this arrangement, the amount of vapor discharged into the hatching chamber can be controlled.

Figure 6:
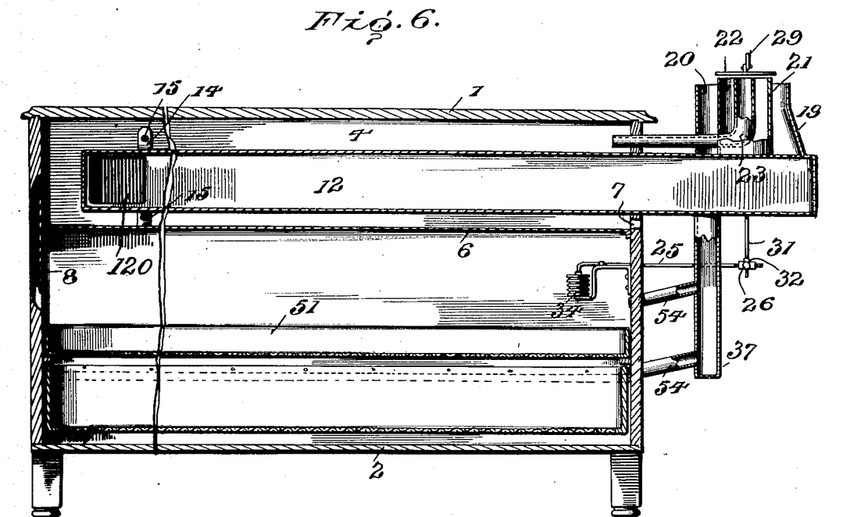
Figs. 6 and 7, are vertical longitudinal sections illustrating modified arrangements.

I do not as at present advised, by experience, wish to limit my invention, to incubators of what might be termed the under or bottom heating type, that is the type where the heating devices are arranged below the hatching chamber, for I can, in my incubator, arrange the hatching chamber below the heating chamber, and cause the heated air to circulate down from the heating chamber to and through the hatching chamber, as shown by Fig. 6. In this arrangement, the heating chamber 4 is arranged in the upper part of the incubator casing, and the hot air flues 8, pass down therefrom to the hatching chamber immediately below the heating chamber, and at the lamp end of the casing, the outlets 54, from the hatching chamber open into a hollow downward extension 37, of the hood 19, and through which an upward draft is maintained by the heat from the lamp rising through the upper part of the hood as hereinbefore described.

The heating system disclosed can be employed in other forms of incubators than those disclosed herein, and can also be used in brooders or other chicken culture apparatus, as well as for heating other devices. The hood 19, or its equivalent, can also be employed in other connections for maintaining a forced draft through various forms or arrangements of heating flues or drums.

It is evident that various changes and modifications might be resorted to, that parts might be omitted or elements added without departing from the spirit and scope of my invention, hence I do not wish to limit myself to the exact constructions and arrangements shown.

What I claim is:—

1. An incubator comprising a casing having a heated chamber arranged longitudinally thereof and a hatching chamber arranged longitudinally thereof, a hot air duct being provided for conveying heated air from an end of the heated chamber and discharging the same into an end of the hatching chamber, a heating drum longitudinally arranged within the heated chamber, said drum being arranged within said chamber to form air spaces around the drum, means for heating said drum, said heated chamber having a fresh air inlet below said drum and at the end of the chamber opposite said hot air duct, whereby the air in said chamber passes around said drum and flows throughout the length of the chamber to said duct, the end of the hatching chamber opposite said duct being provided with a hot air outlet, and thermostatic controlled means for regulating the temperature in said hatching chamber.

2. An incubator having a heated chamber, a hatching chamber, hot air flues from one end of the heated chamber discharging into an end of the hatching chamber, said hatching chamber provided with an air outlet, a heating drum in the heated chamber provided with a heater, said heated chamber provided with an end air inlet below said heating drum, said heated chamber forming air spaces around said drum and communicating with said air inlet at one end of the chamber and with said flues at the opposite end of the chamber.

3. An incubator having a horizontally disposed heated chamber, and a hatching chamber, a heated air flue from the heated chamber to the hatching chamber, the hatching chamber being provided with an air outlet, and the heated chamber with an air inlet, heated flues arranged longitudinally within the heating chamber and above the floor thereof and projecting through and beyond an end thereof, said flues provided with a discharge at the exterior of the chamber, and a heater arranged at the exterior of the chamber and opening into one of said flues to heat the same.

4. An incubator having an internal heated chamber extending throughout the length thereof and a hatching chamber parallel with and adjacent to the heated chamber, the heated chamber provided with an air inlet at one end, a vertical hot air flue in the opposite end of the incubator casing and opening into the upper portion of the heated chamber and into the upper portion of the hatching chamber, said hatching chamber at its opposite end provided with an air outlet, a normally closed thermostatic-controlled direct heated-air outlet from said heated chamber, and means within the heated chamber for heating the air therein.

5. In chicken culture apparatus a casing comprising a heated chamber, heating flues therein comprising a main flue and a return flue, said flues being arranged adjacent to each other and communicating at their inner ends, a heater opening into the outer end of the main flue through the bottom thereof, a hood inclosing the top portions of the outer ends of said flues above said heater and having a top discharge opening, the return flue having a discharge opening into said hood, whereby the air in the hood is heated by said heater thereby creating an upward draft in the hood and a suction through the return flue discharge whereby the draft is maintained through the main and return flues.

6. In combination, a casing having a chamber to be heated, an elongated heating flue arranged therein, an elongated return flue at its inner end communicating with and receiving the heated products from the inner end of the heating flue and having a discharge opening at its outer or opposite end, a heater opening through the bottom of the opposite or outer end of said heating flue and discharging its products upwardly thereinto and against the top wall thereof, and a discharge hood mounted on said heating flue and inclosing said top wall thereof and rising vertically therefrom and having a contracted top discharge opening, said discharge opening of the return flue opening into said hood, for the purposes substantially as described.

7. In combination, a casing having a chamber to be heated, an elongated heating flue arranged horizontally in said chamber, the outer end of said flue having a bottom opening, a heating lamp adapted to discharge its products vertically into said flue and against the top wall thereof, an elongated return flue at its inner end communicating with the inner end of said heating flue, and at its outer end having a vertically disposed discharge hood arranged over the outer end of said heating flue under which the heating lamp is located, and having a contracted top discharge opening, whereby the heat radiated upwardly from said lamp and through said wall maintains an upward draft through said hood.

8. In chicken culture apparatus, a heating apparatus comprising elongated horizontally disposed main and return flues communicating at their inner ends to carry the heated products through the main flue and from the inner end thereof back through the return flue, the main flue at its outer end adapted to receive the heated products from a heating lamp arranged below the same, the return flue being arranged beside the main flue and having a discharge opening at its outer end for the escape of the heated products, and means arranged over said discharge and adapted to be heated by said lamp for maintaining a forced draft through said main and return flue and out through said discharge.

9. Chicken culture apparatus having, a chamber to be heated, a heating flue therein adapted to receive heated products from a heating lamp and having a vertical discharge, and a hot air discharge pipe from said heated chamber direct to the exterior of the chamber, means normally closing said pipe, and heat controlled mechanism for actuating said means to open said pipe.

10. Chicken culture apparatus having, a chamber to be heated, and a hatching chamber having an air outlet, said first mentioned chamber having a fresh air supply, a heated air passage connecting said chambers, a normally closed direct air outlet from said chamber to be heated, and means for opening said outlet, for the purposes substantially as described.

11. Chicken culture apparatus having, a heated chamber having a fresh air inlet, a hatching chamber having an outlet, a passage for heated air from the heated chamber to said hatching chamber, a direct outlet pipe from the heated chamber to the atmosphere for cooling said chambers, a damper normally closing said pipe, and thermostat actuating means for opening said damper, said actuating means being controlled by the temperature of said hatching chamber.

12. An incubator comprising a casing having a hatching chamber and a heated chamber, means for heating the heated chamber comprising a heating flue adapted to receive the heated products of a heating lamp and having a vertical discharge, means being provided to normally permit circulation of fresh air into and through the heated chamber and therefrom into and through the hatching chamber, said means comprising a discharge duct from the hatching chamber into said vertical discharge, normally closed means for discharging the heated products direct from said flue without passing the same therethrough, normally closed means for discharging heated air direct from said heated chamber to stop the normal circulation from the heated chamber to the hatching chamber, and a thermostatic regulator for opening and closing said two last mentioned means.

13. Chicken culture apparatus having, a chamber to be heated, heating flues therein comprising a main flue and a return flue having a discharge at its outer end, said flues communicating at their inner ends to carry the heated products throughout the lengths thereof, said main flue adapted to receive at its outer end the heated products of a heating lamp and having a direct vertical discharge pipe opening through the top wall of its outer end, a direct air outlet pipe from said chamber having its upper outlet end arranged within the upper outlet end of said discharge pipe, a single damper normally closing the upper ends of said two pipes, and thermostat actuating means for moving said damper to open said pipes.

14. An incubator having a hatching chamber and a heated chamber provided with a direct air outlet with a vertical discharge end, means for heating said discharge end to accelerate the discharge therefrom, thermostatic-controlled means normally closing said outlet, and means to normally maintain a constant circulation of fresh air into and through the heated chamber and therefrom into and through the hatching chamber and discharging therefrom, substantially as described.

15. An incubator comprising a casing having a horizontally disposed heated chamber arranged longitudinally thereof, and a longitudinally disposed hatching chamber arranged above the heated chamber, said casing at its rear end provided with a vertical duct from the upper portion of the heated chamber to the upper portion of the rear end of the hatching chamber, the hatching chamber at its front end provided with a heated air outlet, a heating drum arranged longitudinally within the heated chamber and projecting therefrom at the front end of the casing, said heated chamber having a fresh air inlet at its front end, the projecting front end of said drum adapted to receive the heated products of a heating lamp and provided with a vertical discharge, said front end of the heated chamber having a direct discharge passage to the exterior thereof, and thermostatic controlled means normally closing said discharge.

16. An incubator having a hatching chamber, heating means, and a removable water tank heated by said means and having top openings into the hatching chamber and provided with means for varying the dimensions of said openings to vary the amount of vapor discharged into the hatching chamber.

17. An incubator having a heated chamber having an air inlet, a hatching chamber, having an air outlet, flues for passing heated air from the heated chamber into the hatching chamber and a removable water tank forming the division or partition between said chambers and open into said hatching chamber.

18. An incubator having a hatching chamber, a heated chamber, a heating flue arranged longitudinally and removably in the heated chamber and projecting to the exterior thereof to receive a heating lamp, and means within the heated chamber removably supporting said flue within said chamber.

19. An incubator having a casing with a heated chamber and a hatching chamber, the heated chamber having an air inlet and the hatching chamber an air outlet, means for passing heated air from the heated chamber into the hatching chamber, means for heating air in the heated chamber, and temperature controlling means embodying a normally closed direct outlet from the heated chamber to the exterior of the casing, and a normally closed direct outlet for reducing the temperature of said air heating means and a thermostatic regulator for simultaneously opening and closing said outlets.

20. An incubator comprising a casing having a hatching chamber and a heated chamber, the bottom floor of the casing forming the bottom of the heated chamber, means above said floor for heating the air in said heated chamber, means for distributing the heated air in the heated chamber to the hatching chamber, and an auxiliary brooder arranged below said casing and comprising an open top box supported from the casing and closed at the top by said floor thereof, substantially as described.

21. An incubator comprising a casing having a hatching chamber and a heated chamber, means for maintaining a circulation of heated air from the heated chamber to and through the hatching chamber, and means for heating air in said heated chamber comprising elongated main and return heating flues arranged longitudinally within said heated chamber and closed from communication therewith, a heating lamp to discharge its products into the inlet end of said main flue, said return flue at its inlet end receiving said products from the outlet end of the main flue and at its outlet end having a vertical discharge above the plane of and adjacent to said lamp, and subject to the heat radiated therefrom, for the purposes substantially as set forth.

22. Chicken culture apparatus comprising a casing having an air heated chamber, means to maintain a circulation of air therethrough and therefrom, and means for heating air in said chamber comprising elongated main and return heating flues arranged therein, and means to discharge heated products into the receiving end of the main flue, said return flue at its receiving end opening into and receiving said products from the outlet end of the main flue and at its outlet end having a vertical discharge chimney above the receiving end of and closely adjacent to said main flue and said means and subject to the heat thereof to cause acceleration of vertical flow of air and products through said chimney, substantially as described.

23. An incubator comprising a casing having a heated chamber with a fresh air inlet and a hatching chamber, a heating drum arranged in said heated chamber for heating the air therein, means for passing heated air from the heated chamber to the hatching chamber, a heating lamp adapted to discharge its products into said drum, a vertical discharge chimney from said drum, and an air discharge pipe from said hatching chamber into said discharge chimney.

24. An incubator comprising a casing having a hatching chamber and a heated chamber, means for heating said chamber comprising a heating flue arranged therein and projecting at one end thereof at the exterior of the casing and having a discharge, said flue at its projecting end adapted to receive the heated products of a heating lamp and at said end having a direct discharge adapted to reduce the temperature of the flue by directly discharging said products without passing the same through the flue within said heated chamber, means for passing heated air from the heated chamber to the hatching chamber and for permitting circulation of air through said chambers, a heated air direct discharge from the heated chamber to the exterior thereof, and thermostatic controlled means for opening and closing said direct discharge from the flue and said direct discharge from the heated chamber, substantially as described.

25. In chicken culture apparatus, a casing having a chamber to be heated, and heating means therefor comprising a flue arranged in said chamber and at its inlet end adapted to receive the heated products from a lamp, a return flue at its inlet end receiving the heated products from the outlet end of said flue and at its outlet end having a vertical discharge chimney, and a vertical pipe arranged within said discharge chimney and normally closed at its upper end and at its lower end opening into the inlet end of said flue, substantially as described.

26. In chicken culture apparatus, a casing having a chamber to be heated, heating means therefor comprising a flue arranged longitudinally within said chamber and at its inlet end adapted to receive the heated products from a lamp, a return flue arranged longitudinally within said chamber and at its inlet end receiving said products from the outlet end of said flue, a vertical discharge chimney mounted on and rising from the inlet end of said flue, said return flue at its outlet end discharging into said chimney, said chimney being closed at its lower end from the inlet end of said flue.

27. In chicken culture apparatus, a chamber to be heated, heating means therefor comprising a flue arranged therein, and at its inlet end adapted to receive heated products, a return flue receiving the heated products from the outlet end of said flue, a vertical discharge chimney open at the upper end and receiving the heated products from the outlet end of said return flue, and a direct air discharge pipe from the interior of said chamber having a vertical discharge end arranged within said chimney and normally closed at the top.

28. An incubator comprising a casing having a heated chamber and a hatching chamber, a flue arranged in the heated chamber for heating the air therein and having its receiving end at the exterior of the casing and adapted to receive the heated products of a heating lamp and having a vertical discharge at the exterior of the casing, means for permitting circulation of air into and through the heated chamber and therefrom into and through the hatching chamber comprising an air discharge duct from the hatching chamber into said discharge, a direct normally closed discharge from the receiving end of said heating flue, a direct discharge from the heated chamber to the exterior thereof, and thermostatic means for opening and closing said direct discharge from the flue and said direct discharge from the heated chamber.

In testimony whereof I affix my signature, in presence of two witnesses.

VIRGIL C. KOONS.

Witnesses:
J. C. SPICER,
B. B. IRELAND.